Figure 1:
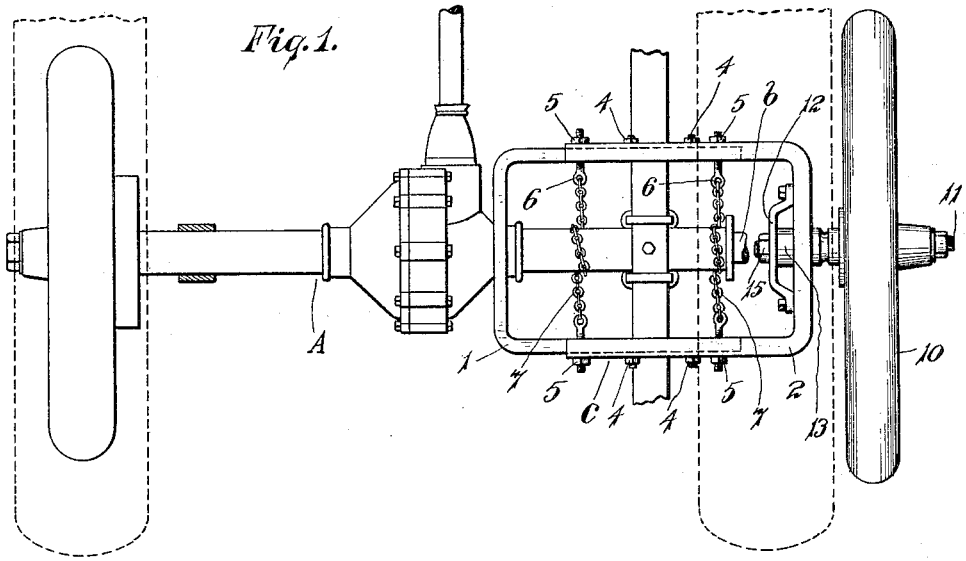

C. H. BREWSTER.
AUTOMOBILE WRECKING APPARATUS.
APPLICATION FILED OCT. 17, 1913.

1,108,690.

Patented Aug. 25, 1914.

WITNESSES:

INVENTOR.
Charles H. Brewster.
BY
his ATTORNEY.

UNITED STATES PATENT OFFICE.

CHARLES H. BREWSTER, OF MIDDLETOWN, CONNECTICUT.

AUTOMOBILE WRECKING APPARATUS.

1,108,690. Specification of Letters Patent. Patented Aug. 25, 1914.

Application filed October 17, 1913. Serial No. 795,750.

*To all whom it may concern:*

Be it known that I, CHARLES H. BREWSTER, a citizen of the United States, and a resident of Middletown, in the county of Middlesex, State of Connecticut, have invented certain new and useful Improvements in Automobile Wrecking Apparatus, of which the following is a specification.

The device forming the subject matter of this invention is intended especially for use in connection with an automobile where an axle has been broken and it is necessary to tow the car into a garage or repair shop, and provides means for attaching to the end of the broken axle a frame carrying a dummy wheel, and particularly means for supporting the axle in this frame in such a manner as to hold the dummy wheel in accurate alinement, though preferably out of tracking relation, with the other wheel on the same side of the car.

An embodiment of the invention is illustrated in the drawings, where—

Figure 2:
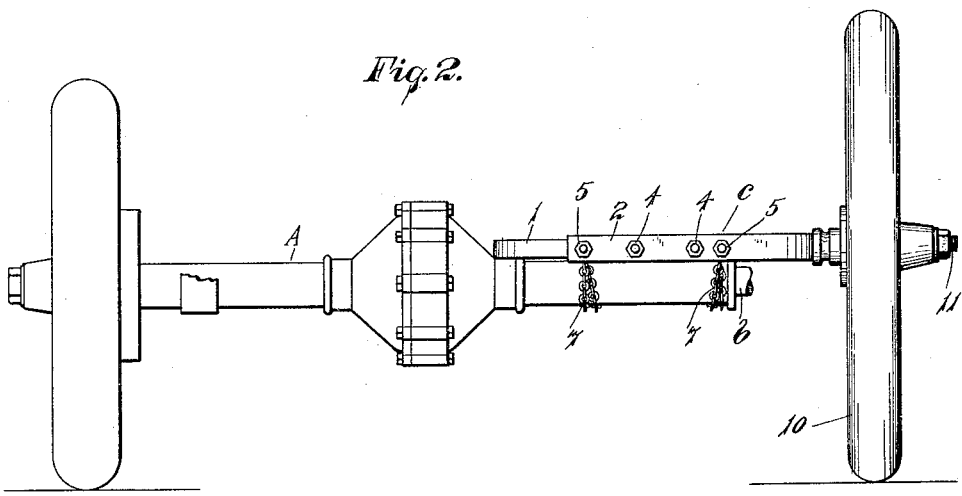
Figure 3:
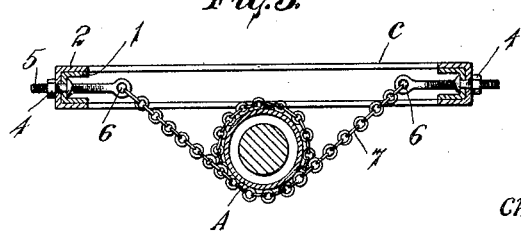

Figure 1 is a plan view of a rear axle housing, showing my device attached thereto. Fig. 2 is a view in elevation of the parts shown in Fig. 1. Fig. 3 is a transverse sectional view of the frame and showing its attachment to the axle housing.

This invention is illustrated as applied to a rear axle housing where the axle has been broken at one end.

A denotes the housing, and b the end of the broken axle.

My device comprises a frame, indicated generally at c, and made in two parts, 1, 2, preferably of channel iron as shown in Fig. 3, the cross section of one of the frames, as 1, being of such size as to telescope into the cross section of the other frame 2, as clearly shown in Fig. 3. The telescoping arms are joined together by bolts, 4, 4, 5, 5, and conveniently the end bolts, 5, 5, may be provided with eyes 6, at their ends into which chains 7, 7, may be secured, these chains being wrapped around the housing, as clearly shown in the drawings. The nuts at the ends of these bolts 5, 5, permit of adjusting them so as to draw the chains tight, and when the weight of the car is dropped into the chains they take a firm grip on the housing and securely hold it in place so that it cannot shift laterally within the frame, with the result that when the wheel which is carried by the outer frame part 2 strikes an obstruction, it rides over it and does not shift the frame laterally to throw the wheel out of alinement. It is of great importance that this wheel shall be maintained in proper position with relation to the other wheel on that side of the car in order to facilitate the towing of the car at any reasonable rate of speed.

The dummy wheel 10 is mounted on a stub shaft 11, the end of which is supported in the end of the frame part 2, and in a strut 12, between which and the frame there is located a cast iron bearing sleeve 13. This stub shaft is held in place by the nut 15, or in some equivalent and satisfactory manner.

While I have shown the frame as made up of a channel cross section, it will be apparent that other cross sections can be used, and while I prefer to use a chain to secure the frame to the axle housing since the chain will take a very tight grip upon a round housing such as is often used, nevertheless in some cases other devices than the chain will fulfil the requirements.

This device is of simple and inexpensive construction, may be very easily applied to a broken axle and is extremely efficient in performing the service desired.

It is preferable that the dummy wheel 10 be positioned outside of the fender which covers the regular wheel in order to avoid any possible damage to the fender during the towing.

I claim as my invention:—

1. In a device of the character described, a frame adapted to be located above a broken axle and supported at one end thereby, a wheel secured to and constituting a support for the other end of the frame, and flexible members wrapped about said axle and with their ends secured to the side bars of said frame.

2. In a device of the character described, a frame, a pair of chains connected at their ends to the sides of said frame and with their center portions adapted to be wrapped about an axle, a shaft supported in and projecting from the outer end of said frame, and a wheel mounted upon said shaft.

3. In a device of the character described, a frame comprising inner and outer members, means for securing together the side arms of said members, chains secured to said side arms near the ends thereof and adapted to have their center portions wrapped about an axle, a shaft mounted in and projecting from the end of the outer frame member, and a wheel supported on said shaft.

4. In a device of the character described, a frame, flexible means for securing said frame to an axle, a strut secured to the outer end of said frame and spaced therefrom, a filling block interposed between said strut and frame, a stub shaft supported in the bearing formed by said frame, filling block and strut, and a wheel mounted upon said shaft.

5. In a device of the character described, a frame formed of two parts from channel iron bent to U shape, the side arms of said parts adapted to telescope together, means for binding said arms together, chains secured at their ends to said side arms and adapted at their central parts to be wrapped about an axle, a shaft projecting from the end of the outer frame, and a wheel mounted thereon.

6. In a device of the character described, a frame, a pair of chains extending across said frame near the ends thereof, the central portions of which are adapted to be wound about an axle, adjustable means for securing the ends of said chains to the sides of said frame, and a wheel supported by said frame.

7. In a device of the character described, a frame, a pair of flexible members extending across said frame near the ends thereof, the central portions of which are adapted to be wound about an axle, and means for securing the ends of said flexible members to the sides of said frame.

CHARLES H. BREWSTER.

Witnesses:
H. E. HART,
ANNE E. O'BRIEN.

---

Copies of this patent may be obtained for five cents each, by addressing the "Commissioner of Patents, Washington, D. C."